United States Patent
Mohr

(10) Patent No.: US 8,672,621 B2
(45) Date of Patent: Mar. 18, 2014

(54) WELDED STRUCTURAL FLATS ON CASES TO ELIMINATE NOZZLES

(75) Inventor: Byron L. Mohr, Olean, NY (US)

(73) Assignee: Dresser-Rand Company, Olean, NY (US)

( * ) Notice: Subject to any disclaimer, the term of this patent is extended or adjusted under 35 U.S.C. 154(b) by 548 days.

(21) Appl. No.: 13/014,966

(22) Filed: Jan. 27, 2011

(65) Prior Publication Data

US 2011/0206505 A1    Aug. 25, 2011

Related U.S. Application Data

(60) Provisional application No. 61/306,154, filed on Feb. 19, 2010.

(51) Int. Cl.
*F04D 17/10* (2006.01)

(52) U.S. Cl.
USPC .................... 415/203; 415/213.1; 29/888.024

(58) Field of Classification Search
USPC ....................... 415/203, 204, 205, 206, 213.1; 417/423.14; 29/888.024
See application file for complete search history.

(56) References Cited

U.S. PATENT DOCUMENTS

| | | | |
|---|---|---|---|
| 2,578,481 A | 12/1951 | Lombard | |
| 2,850,876 A | 9/1958 | Wood | |
| 3,283,723 A * | 11/1966 | Charlson | 417/440 |
| 3,420,434 A | 1/1969 | Swearingen | |
| 3,628,627 A | 12/1971 | Arnold | |
| 3,696,637 A | 10/1972 | Ness | |
| 4,198,740 A | 4/1980 | Prevender | |
| 4,398,867 A | 8/1983 | Dernedde | |
| 4,399,651 A | 8/1983 | Geary | |
| 4,432,824 A | 2/1984 | Cook | |
| 4,477,223 A | 10/1984 | Giroux | |
| 4,484,689 A | 11/1984 | Fuchs, Jr. | |
| 4,524,996 A | 6/1985 | Hunt | |
| 4,545,101 A | 10/1985 | Hilts | |
| 4,759,178 A | 7/1988 | Joy | |
| 4,826,071 A | 5/1989 | Becker | |
| 4,834,622 A | 5/1989 | Schuh | |
| 4,870,732 A | 10/1989 | Becker | |
| 4,881,880 A * | 11/1989 | Dlugokecki | 418/61.3 |
| 4,893,388 A | 1/1990 | Amos | |
| 4,903,888 A | 2/1990 | Clark | |

(Continued)

FOREIGN PATENT DOCUMENTS

JP    2004190665    7/2004

OTHER PUBLICATIONS

International Application No. PCT/US2011/020219—Notification of Transmittal of International Search Report and Written Opinion mailed Sep. 14, 2011.

(Continued)

*Primary Examiner* — Igor Kershteyn
(74) *Attorney, Agent, or Firm* — Edmonds & Nolte, PC

(57) ABSTRACT

A casing assembly for a compressor where traditional inlet and discharge nozzles are replaced with a mounting surface created from weld filler or weld material applied to the outside surface of a casing. The weld material and a portion of the outside surface of the casing are cooperatively milled to create a generally planar or flat surface having a casing conduit centrally-disposed therein. A flange may then be coupled to the flat surface for the inlet or discharge of a process gas.

19 Claims, 3 Drawing Sheets

(56) References Cited

U.S. PATENT DOCUMENTS

| | | |
|---|---|---|
| 4,959,523 A | 9/1990 | Fihey |
| 4,972,880 A | 11/1990 | Strand |
| 5,052,845 A | 10/1991 | Maus |
| 5,085,363 A | 2/1992 | Sims |
| 5,248,239 A | 9/1993 | Andrews |
| 5,605,361 A | 2/1997 | Sims |
| 5,671,532 A | 9/1997 | Rao |
| 5,775,302 A | 7/1998 | Guido |
| 5,918,911 A | 7/1999 | Sims |
| 5,957,507 A | 9/1999 | Asada |
| 6,085,545 A | 7/2000 | Johnston |
| 6,134,875 A | 10/2000 | Hines |
| 6,154,946 A | 12/2000 | Kapp |
| 6,310,414 B1 | 10/2001 | Agahi |
| 6,439,836 B1 | 8/2002 | Pozivil |
| 6,506,017 B2 | 1/2003 | Mariotti |
| 6,581,409 B2 | 6/2003 | Wilding |
| 6,826,909 B2 * | 12/2004 | Walls ............................ 60/468 |
| 6,955,288 B2 | 10/2005 | Barnes |
| 2003/0024629 A1 | 2/2003 | Wright |
| 2006/0027628 A1 | 2/2006 | Sutherlin |
| 2008/0216510 A1 | 9/2008 | Vandor |
| 2009/0205839 A1 | 8/2009 | Cook |
| 2009/0257902 A1 | 10/2009 | Ernens |
| 2009/0293503 A1 | 12/2009 | Vandor |

OTHER PUBLICATIONS

International Application No. PCT/US2011/021369—Notification of Transmittal of International Search Report and Written Opinion mailed Sep. 28, 2011.

International Application No. PCT/US2011/022716—Notification of Transmittal of the International Search Report and Written Opinion mailed Oct. 24, 2011.

* cited by examiner

WELDED STRUCTURAL FLATS ON CASES TO ELIMINATE NOZZLES

CROSS-REFERENCE TO RELATED APPLICATIONS

This application claims priority to U.S. Patent Application Ser. No. 61/306,154, which was filed Feb. 19, 2010. The priority application is hereby incorporated by reference in its entirety into the present application.

BACKGROUND

To ensure long-term operation, compressor casings must be designed to withstand extreme pressures and potentially corrosive environments, especially in the oil and gas industry. A typical compressor consists of a casing, usually in the shape of a cylindrical body, which is sealed at its ends and houses the operating components of the machine. The compressor will usually have an inlet nozzle and a discharge nozzle welded to the outside surface of the casing where the gas or fluid is either introduced to or discharged from the casing, respectively.

For commercial consumption, compressor casings must also meet industry standards and regulations. For instance, certain compressor casings are required to meet safety regulations and standards stipulated by the National Association of Corrosion Engineers ("NACE"). At least one NACE standard prescribes minimum hardness requirements for any compressor base metal, weld metal, and heat affected zone that may come in contact with corrosive process gases or fluids during compressor operations. For compressors having inlet and discharge nozzles welded to the outside surface of the casing, this standard can be extremely difficult to satisfy. For example, special base metal and weld metals are often required during manufacturing, and such metals can restrict the casing chemistry needed to achieve standard requirements after welding. Moreover, because of the NACE requirements, there are only a limited number of weld wires that can effectively be employed.

As an alternative to complying with the stringent NACE requirements, some have milled structural flats on the compressor that allow inlet and discharge flanges to be coupled directly to the casing, instead of to the welded-on inlet and discharge nozzles. By so doing, process gases and fluids only come into contact with the pure base metal of the casing and flanges and NACE requirements are met via the base metal itself. To use structural flats, however, a larger diameter casing than what is actually needed is required so that a portion of the casing can be milled away and removed to provide a mounting surface for the flanges. A larger diameter casing, unfortunately, can add significant expense to the overall compressor system.

What is needed, therefore, is a compressor casing that overcomes the disadvantages of prior applications as outlined above.

SUMMARY

Embodiments of the disclosure may provide a casing assembly for a compressor. The casing assembly may include a barrel defining a centrally-disposed bore, and a conduit defined in the barrel and in fluid communication with the bore. The casing assembly may further include a mounting surface formed around a perimeter of the conduit on an outside surface of the barrel, the mounting surface comprising multiple built-up layers of a weld material.

Embodiments of the disclosure may further provide a method of making a casing assembly for a compressor. The method may include applying multiple layers of a weld filler material to an outside surface of a casing about a conduit defined therein, and heat treating multiple layers of weld filler material to reduce residual stresses. The method may further include milling the multiple layers of weld filler material and a section of the casing to create a substantially planar mounting surface. A flange may then be coupled to the mounting surface to form a gas tight seal therebetween.

Embodiments of the disclosure may further provide another casing assembly for a compressor. The casing assembly may include a barrel defining a centrally-disposed bore and an outside surface, and a conduit defined in the barrel and in fluid communication with the bore. The casing assembly may further include a mounting surface formed on the outside surface of the barrel, the mounting surface comprising multiple built-up layers of a weld material applied to opposing sides of the conduit about a circumference of the outside surface of the barrel.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1A:
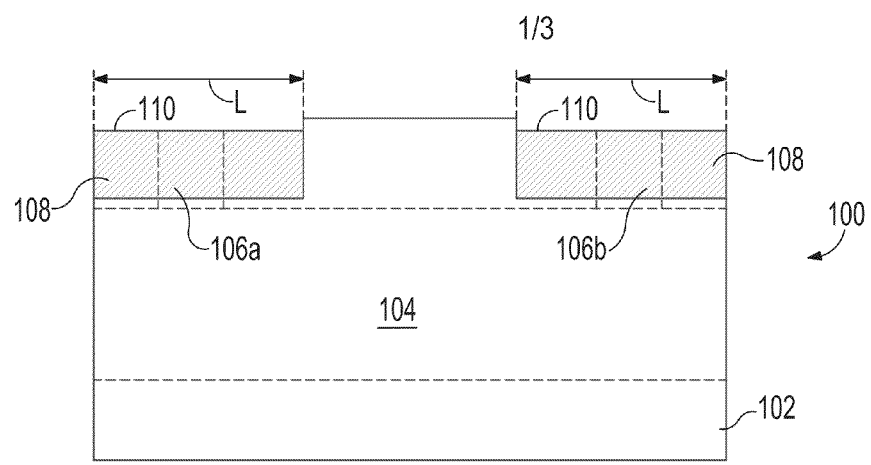
FIG. 1A illustrates a side view of an exemplary casing assembly, according to one or more embodiments of the present disclosure.

It is to be understood that the following disclosure describes several exemplary embodiments for implementing different features, structures, or functions of the invention. Exemplary embodiments of components, arrangements, and configurations are described below to simplify the present disclosure, however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Further, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

Figure 1B:
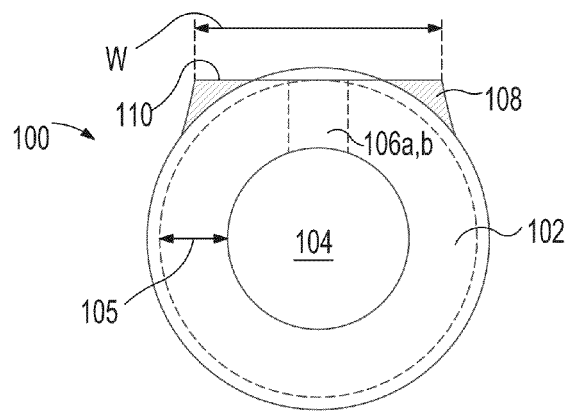
FIG. 1B illustrates an end view of the exemplary casing assembly of FIG. 1A, according to one or more embodiments of the present disclosure.
Figure 1C:
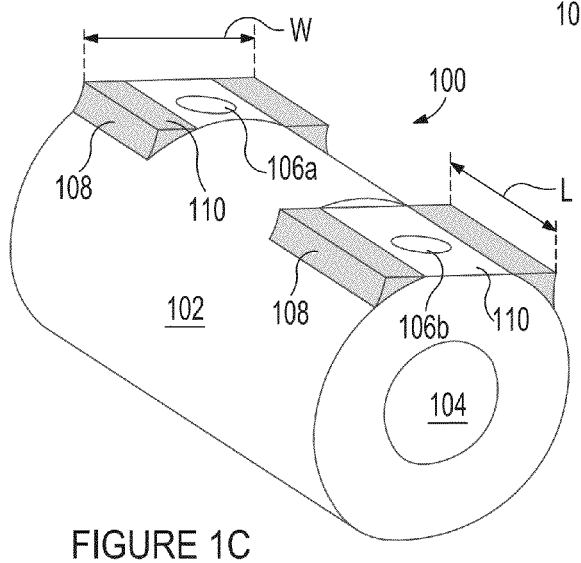
FIG. 1C illustrates an isometric view of the exemplary casing assembly of FIG. 1A, according to one or more embodiments of the present disclosure.

FIGS. 1A-1C illustrate an exemplary casing assembly 100, according to one or more embodiments disclosed. FIG. 1A provides a side view, FIG. 1B an end view, and FIG. 1C depicts an isometric view of the casing assembly 100. In at least one embodiment, the casing assembly 100 can be implemented as a compressor casing, either for a positive displacement compressor or a dynamic compressor. In one or more embodiments, the casing assembly 100 can be used in a centrifugal compressor application for operation in the oil and gas industry (i.e., upstream, midstream, and downstream).

The casing assembly 100 includes a substantially-cylindrical barrel 102 that defines an axially-extending bore 104. The bore 104 is concentrically-disposed within the barrel 102 and extends axially from one end of the barrel 102 to the other. In an exemplary embodiment, the barrel 102 may be forged as a single-piece, but may also be assembled from two or more segments to form a complete casing barrel 102. In other embodiments, however, the barrel 102 may be manufactured by other processes known in the art, such as machining from a single piece of material. Since the process gas being compressed in the casing assembly 100 may be potentially corrosive, the barrel 102 may be made of a non-corrosive material, such as stainless steel or other variations of carbon steels that are overlaid resistant to corrosive environments. It will be appreciated, however, that the barrel 102 may be made out of any material known in the art that exhibits corrosion-resistive and pressure-containing properties.

Pressures in compressor applications can range anywhere from about 1,200 psi to about 15,000 psi. To withstand such extreme pressures, the minimum thickness of the barrel 102 is determined in order to manufacture a barrel 102 that meets and/or exceeds the pressure requirements. Referring to FIG. 1B, the required thickness of the barrel 102 to withstand pressures for an exemplary application is illustrated by arrow 105. For reasons that will be described below, the barrel 102 may be manufactured to an overall thickness slightly larger than the required thickness 105.

The barrel 102 may also define an inlet conduit 106a and a discharge conduit 106b for the receipt and discharge of process gases, respectively. As can be appreciated, the barrel 102 may define more than two conduits 106a,b without departing from the scope of the disclosure. In one or more embodiments, the conduits 106a,b may be directly forged into the casing assembly 100 at predetermined locations along the axial length of the casing assembly 100 and subsequently machined to tolerances. In other embodiments, however, the conduits 106a,b may be machined into the casing assembly 100 at the predetermined locations.

The casing assembly 100 may further include a weld material or weld filler 108 applied to the outside surface of the barrel 102 at or near the location of each conduit 106a,b. The weld filler 108 may generally be applied to add material to the outside surface of the barrel 102. In one or more embodiments, the weld filler 108 is applied in multiple layers about (e.g., around) the perimeter of each conduit 106a,b. In other embodiments, the weld filler 108 is applied only proximate each conduit 106a,b, but not extending completely around the perimeter of each conduit 106a,b. For example, in at least one embodiment, the weld filler 108 may be applied to opposing sides of each conduit 106a,b about the circumference of the barrel 102, but not on opposing sides along the axial length of the barrel 102.

In at least one embodiment, the weld filler 108 may provide at least a portion of a mounting surface 110. The length L and width W of the weld filler 108 may be determined from the known general size and/or dimensions of any coupling component (e.g., the inlet flange 202a and discharge flange 202b shown in FIGS. 2A and 2B) that will eventually be coupled to the barrel 102. In other words, the weld filler 108 may be applied in a large enough area about each conduit 106a,b so as to accommodate the corresponding size of each coupling component to be attached thereto. In one embodiment, an additional amount of weld filler 108 is applied to the length L and width W to account for dimensional variations and also to boost the structural integrity of the mounting surface 110.

The weld filler 108 may be applied in multiple layers to the surface of the barrel 102 using a variety of welding methods. For example, weld methods that may be used include, but are not limited to, shielded metal arc welding, gas tungsten arc welding (e.g., tungsten inert gas (TIG) welding), flux-cored arc welding, submerged arc welding, strip submerged arc welding, strip electroslag welding, and gas metal arc welding (i.e., MIG or MAG welding). In other embodiments, the weld filler 108 may be applied to the surface of the barrel 102 using laser cladding techniques.

To enhance the quality of the weld, the barrel 102 may be locally preheated (i.e., around the area of the conduits 106a,b) to a temperature of about 200° F. to about 500° F. In other embodiments, the entire barrel 102 may be preheated. In at least one embodiment, the welding process may employ multi-pass overlay welding techniques, such as spiral or stepover type techniques, that result in melting approximately ½ the previous weld bead. Until the welding process is completed, a minimum interpass temperature of about 200° F. to about 500° F. may be maintained in the region adjacent the conduits 106a,b. In one embodiment, the interpass temperature may be maintained lower than 800° F. during the welding process.

Subsequent to the application of the weld filler 108 to the approximate desired length L and width W adjacent the conduits 106a,b, the entire casing assembly 100 may undergo at least one thermal stress cycle. The thermal stress cycle may be configured to reduce the residual stresses generated due to the welding process, but it may also serve to minimize the hardness of the weld filler 108 and adjacent heat affected zone ("HAZ"), thereby increasing the overall ductility of the material. In one or more embodiments, the thermal stress cycle may include placing the entire casing assembly 100 in an atmosphere-controlled furnace at a temperature ranging from about 1000° F. to about 1200° F. (±25° F.) for at least one hour per one inch of weld thickness. In other embodiments, the thermal stress cycle can be undertaken locally by heating only the weld filler 108 and HAZ from about 1000° F. to about 1200° F. (±25° F.) for at least one hour per one inch of weld thickness. Thermal stress cycles may prove advantageous in increasing the ductility of the casing assembly 100, thereby providing for longer useful life.

Once the weld filler 108 and HAZ have been properly treated via one or more thermal stress cycles, the weld filler 108 may be further prepared for receipt of the inlet and discharge flanges 202a,b. In at least one embodiment, the weld filler 108 and a portion of the underlying barrel 102 may be milled or otherwise machined to create or otherwise form the mounting surface 110. Once milled, the mounting surface 110 may be a smooth and flat surface, thereby facilitating a fluid tight seal against the barrel 102. As illustrated in FIG. 1C, the conduits 106a,b may be centrally-defined within each mounting surface 110.

Figure 2A:
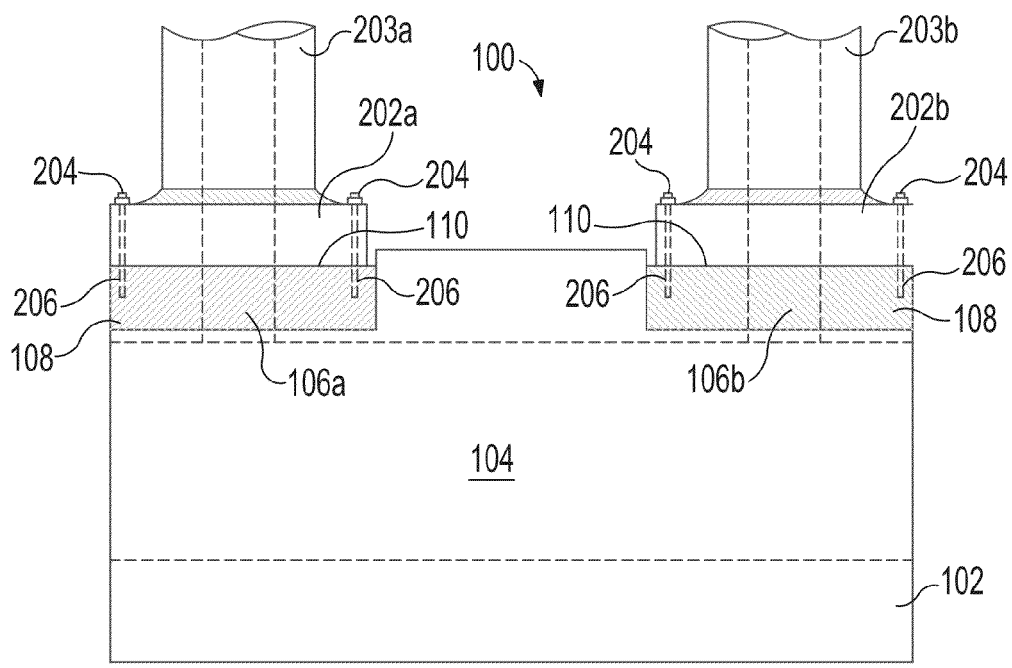
FIG. 2A illustrates a side view of the exemplary casing assembly of FIG. 1A as attached to inlet/discharge flanges, according to one or more embodiments of the present disclosure.
Figure 2B:
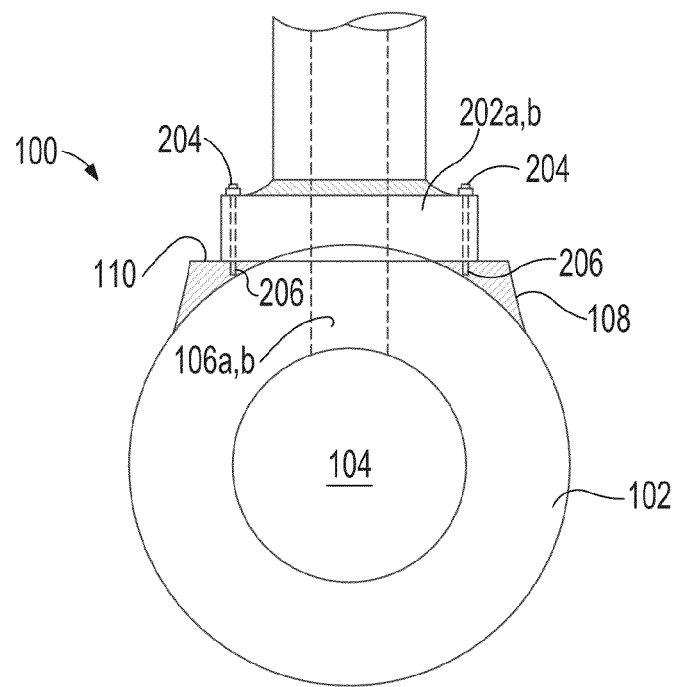
FIG. 2B illustrates an end view of the exemplary casing assembly of FIG. 2A, according to one or more embodiments of the present disclosure.

Referring now to FIGS. 2A and 2B, with continuing reference to FIGS. 1A-1C, depicted are side and end views, respectively, of the casing assembly 100 as coupled or otherwise attached to an exemplary inlet flange 202a and exemplary discharge flange 202b. As illustrated, the flanges 202a,b may be coupled or otherwise attached to an inlet pipeline 203a and discharge pipeline 203b, respectively. In one or more embodiments, the flanges 202a,b may be secured to the mounting surfaces 110 of the barrel 102 by a series of threaded bolts 204 inserted into a series of corresponding threaded bores 206 defined within both the weld filler 108 and the barrel 102. Once coupled to the barrel 102, the flanges 202a,b place the respective pipelines 203a,b in direct fluid communication with the corresponding conduits 106a,b. Accordingly, the mounting surfaces 110 may completely take the place of inlet and discharge nozzles as commonly used in compressor applications.

During operation of the casing assembly 100, process gases do not come into contact with the weld filler 108 but solely communicate with the pure base metal of the barrel 102 and the flanges 202a,b. Consequently, stringent NACE guidelines prescribing minimum hardness and corrosive-resistant standards for welded surfaces coming into contact with process gases may be entirely bypassed. Furthermore, since the flanges 202a,b are coupled to the barrel 102 via the mounting surface 110 created partially by the weld filler 108, an oversized barrel encompassing a significant amount of unneeded material is not required as in prior structural flats applications.

Figure 3:
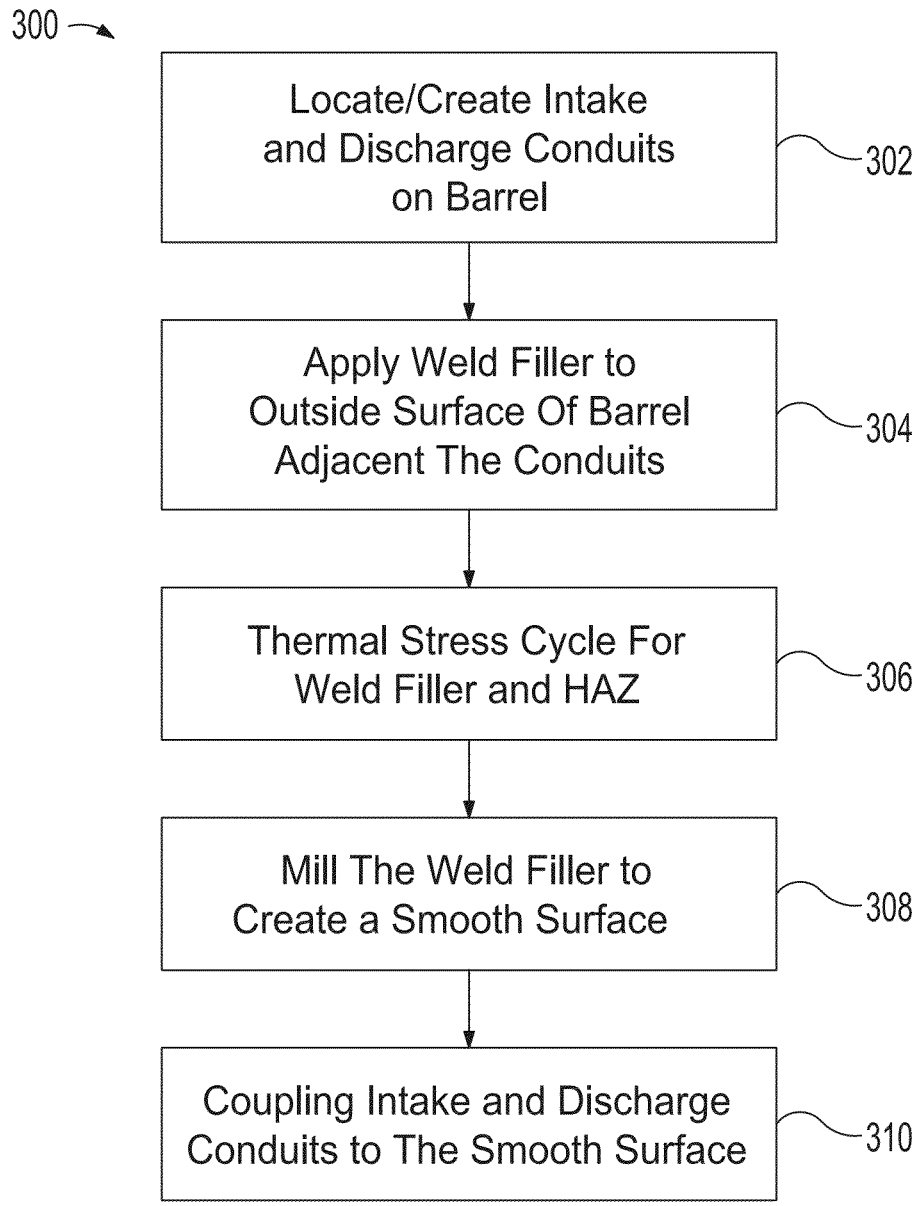
FIG. 3 illustrates an exemplary flowchart method of making a casing assembly, according to one or more embodiments of the present disclosure.

Referring now to FIG. 3, a method 300 of constructing an exemplary casing assembly 100 as described herein is depicted. In one or more embodiments, the method 300 may include locating or creating inlet/discharge conduits on a barrel, as at 302. A weld filler may be applied to the outside surface of the barrel adjacent the conduits, as at 304. The particular dimensions of the weld filler may be tied or otherwise subject to the dimensions of the inlet/discharge flanges that will be subsequently coupled to the barrel. Furthermore, since the weld filler will not be exposed to process gases in the casing assembly, several welding methods may be employed to apply the weld filler, including, but not limited to, shielded metal arc welding, TIG welding, flux-cored arc welding, submerged arc welding, strip submerged arc welding, strip electroslag welding, and MIG welding. In one or more embodiments, the weld filler material is applied in multiple layers across the outside surface of the barrel in order to build up the barrel surface for milling.

The method 300 may further include heat treating the weld filler and accompanying HAZ, as at 306. Such heat treatments, as described herein, may reduce residual stresses in the weld material, but also make the weld filler more ductile. In at least one embodiment, the thermal stress cycle can be imposed on the whole casing assembly, and not just the weld filler and HAZ. The weld filler may then be milled to create a mounting surface, as at 308. Milling the weld filler may, in at least one embodiment, also include milling at least a portion of the barrel to create a smooth and flat mounting plane where the inlet/discharge flanges may be arranged to form a fluid tight seal against the barrel and fluidly communicate with the inlet/discharge conduits, respectively. Once the mounting surface is prepared, inlet and discharge flanges may be coupled thereto, as at 310.

As can be appreciated, there are several advantages to the embodiments disclosed herein. For instance, the barrel 102 may provide the equivalent functionality of a larger barrel 102 but at a lower cost and without diminishing the overall strength of the system 100. Moreover, welding a filler metal to the outside surface of the barrel 102 and milling a flat surface therefrom is not only cost-effective, but also provides a strong and thermally-protected metal bond. Lastly, implementing welded flats to the outside surface of the barrel 102 avoids having to comply with NACE requirements, which can be an expensive and time-consuming process.

As used herein, the term "about" used in conjunction with a numeral can refer to a range of that numeral starting from below the absolute of the numeral to above the absolute of the numeral, inclusive. For example, the term "about 200° F." may refer to a range of 180° F. to 220° F.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

I claim:

1. A casing assembly for a compressor, comprising:
   a barrel defining a bore concentrically-disposed within the barrel;
   a conduit defined in the barrel and in fluid communication with the bore; and
   a mounting surface formed around a perimeter of the conduit on an outside surface of the barrel, at least a portion of the mounting surface formed from multiple built-up layers of a weld material and configured to be substantially planar with a remaining portion of the mounting surface.

2. The casing assembly of claim 1, wherein the remaining portion of the mounting surface further includes a section of the outside surface of the barrel.

3. The casing assembly of claim 1, wherein the mounting surface comprises a milled surface.

4. The casing assembly of claim 3, further comprising a flange connection formed into the mounting surface.

5. The casing assembly of claim 1, wherein the multiple built-up layers of the weld material are applied to the outside surface of the barrel by shielded metal arc welding, TIG welding, flux-cored arc welding, submerged arc welding, strip submerged arc welding, strip electroslag welding, or MIG welding.

6. The casing assembly of claim 1, wherein the weld material is isolated from a process gas flowing within the compressor during compressor operation.

7. The casing assembly of claim 1, wherein the conduit comprises a first conduit for the inlet of a process gas, the barrel further defining a second conduit in fluid communication with the bore for the discharge of the process gas.

8. A method of manufacturing a casing assembly for a compressor, comprising:
   applying multiple layers of a weld material to an outside surface of a casing around a portion of a perimeter of a conduit defined therein;
   heat treating the weld material to reduce residual stresses;
   milling the weld material and a section of the casing to create a planar mounting surface; and
   forming one or more bores in the planar mounting surface to couple a flange thereto and form a fluid tight seal therebetween.

9. The method of claim 8, further comprising preheating an area adjacent the conduit where the weld material is to be applied.

10. The method of claim 9, wherein the area adjacent the conduit is preheated to a temperature of between about 200° F. and about 500° F.

11. The method of claim 8, wherein applying the multiple layers of weld material to the outside surface of the casing comprises welding the weld material to the casing.

12. The method of claim 11, wherein the multiple layers of weld material are welded to the casing using a multi-pass overlay welding technique configured to melt about half of a previous weld bead.

13. The method of claim 8, further comprising applying the weld material to the outside surface of the casing to a length and width corresponding to a structural dimension of the flange.

14. The method of claim 8, wherein heat treating the weld material further comprises heat treating a heat affected zone adjacent the weld material.

15. The method of claim 14, wherein heat treating comprises increasing the temperature of the weld material and heat affected zone to a temperature of from about 1000° F. to about 1200° F.

16. A casing assembly for a compressor, comprising:
   a barrel defining a bore concentrically-disposed within the barrel, and the barrel having an outside surface;
   a conduit defined in the barrel and in fluid communication with the bore; and
   a mounting surface formed on the outside surface of the barrel, at least a portion of the mounting surface formed from multiple built-up layers of a weld material applied to opposing sides of the conduit about a circumference of the outside surface of the barrel, the at least a portion of the mounting surface configured to be substantially planar with a remaining portion of the mounting surface.

17. The casing assembly of claim 16, wherein the weld material is applied in multiple layers to the outside surface of the compressor casing by shielded metal arc welding, TIG welding, flux-cored arc welding, submerged arc welding, strip submerged arc welding, strip electroslag welding, or MIG welding.

18. The casing assembly of claim 16, wherein the weld material is entirely isolated from a process gas during operation of the compressor.

19. The casing assembly of claim 16, wherein the mounting surface is adapted to receive a flange and form a fluid tight seal therebetween.

* * * * *